United States Patent
Frisch

(10) Patent No.: US 6,786,238 B2
(45) Date of Patent: Sep. 7, 2004

(54) SOLENOID VALVE

(75) Inventor: Herbert Frisch, Göppingen-Bartenbach (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/442,305

(22) Filed: May 20, 2003

(65) Prior Publication Data

US 2003/0226601 A1 Dec. 11, 2003

(30) Foreign Application Priority Data

Jun. 11, 2002 (EP) .............................................. 02012871

(51) Int. Cl.⁷ ........................ F15B 13/044; F16K 31/06
(52) U.S. Cl. ............................ 137/625.65; 137/625.44; 251/129.2
(58) Field of Search ....................... 137/625.44, 625.65; 251/129.2

(56) References Cited

U.S. PATENT DOCUMENTS 3,722,531 A    3/1973  Verhart

FOREIGN PATENT DOCUMENTS

| DE | 197 8408 | 11/1998 |
|----|----------|---------|
| EP | 1 172 592 | 1/2002 |

Primary Examiner—Gerald A. Michalsky
(74) Attorney, Agent, or Firm—Hoffmann & Baron, LLP

(57) ABSTRACT

A solenoid valve has an electromagnet with a clapper armature. The clapper armature is installed in a valve chamber, which is provided with an installation opening for the installation of the clapper armature. The electromagnet is provided with a yoke means, which directly closes the installation opening with a closure section. The clapper armature bears in a pivotal fashion at the rear against this closure section.

20 Claims, 3 Drawing Sheets

SOLENOID VALVE

BACKGROUND OF THE INVENTION

The invention relates to a solenoid valve comprising an electromagnet having a coil with an associated yoke means and furthermore a clapper armature for the operation of at least one closing valve member, and a valve housing bearing the coil, said housing having a valve chamber containing the clapper armature with the closing valve member, into which valve chamber an installation opening for the clapper armature is directed, said installation opening being aligned as an extension of the clapper armature and being closed in a sealing manner.

THE PRIOR ART

In the case of a solenoid valve disclosed in the European patent publication 1 172 592 A2 of this type the clapper armature is seated on two yoke pins extending through the valve chamber of a frame-like yoke means. During assembly the clapper armature is inserted through an initially open installation opening into the valve chamber, following which the installation opening is sealed off by a plug-like closure part.

This known solenoid valve comprises a relatively large number of parts, something which entails relatively expensive manufacture.

In the case of a solenoid valve also fitted with a clapper armature in accordance with the German patent publication 19,718,408 A1 the valve chamber containing the clapper armature possesses a longitudinal installation opening, which following the insertion of the clapper armature is sealed off by placing a subassembly thereon comprising a coil with a coil carrier, yoke means and a casing housing. For this purpose complex steps must be taken in order to seal off the valve chamber at the installation opening. Since the valve chamber here extends alongside the clapper armature, this part is furthermore not available for making any valve openings desired. If a plurality of valve openings are to be controlled by the clapper armature, they may accordingly only be provided on the longitudinal side, opposite to the installation opening, of the valve chamber.

SHORT SUMMARY OF THE INVENTION

One object of the invention is to provide a solenoid valve of the type initially mentioned permitting a reduction in the number of components.

In order to achieve these and/or other objects appearing from the present specification, claims and drawings, in the present invention the installation opening is directly closed by a section of the yoke means, the clapper armature bearing in a pivoting manner at the rear on this closure section.

The arrangement of the installation opening as an extension of the clapper armature therefore furthermore renders possible having an installation opening with a small cross section, through which the clapper armature is inserted during its installation in the longitudinal direction. Moreover, this alignment of the installation opening makes possible the provision, if desired, of valve openings on either side of the clapper armature in the wall of the valve chamber. It is more particularly advantageous however that for closing the installation opening no separate closure element is necessary, and instead the yoke means may itself be employed for this purpose by so designing and arranging it that it seals off the installation opening with a closure section thereof. The yoke means is accordingly multi-functional in design and assumes simultaneously a sealing function for the valve chamber in addition to its return function for the magnetic field. It is in this manner that the number of components of the solenoid valve may be reduced.

Further advantageous developments of the invention are defined in the claims.

The yoke means is preferably so designed that it covers over the installation opening like a lid at its closure section. The closure section may be designed like a plate.

For sealing off the installation opening it is preferred to provide a seal placed between the valve housing and the closure section so as to surround the installation opening like a frame. Preferably, the seal is laid in a groove-like recess in the valve housing.

The closure body able to be actuated by the clapper armature is preferably located on the front end, opposite the closure section, of the clapper armature. The closing valve member may be a component permanently connected with the clapper armature or preferably a separate component.

During operation the clapper armature may be switched over between a switching position, in which it is attracted by a stationary solenoid armature part and a further switching position pivoted away from the stationary solenoid armature part. It is convenient for the clapper armature to be constantly urged by a spring means, located in the valve chamber, toward the switching position in which it is pivoted back. For pivoting it toward the stationary armature part and accordingly for switching over into the attracted switching position the coil is excited.

It is an advantage if the clapper armature is made oblique on the rear side so that in the pivoted back switching position it has its rear end face in contact with the closure section over the full area. Accordingly the magnetic field may pass from the yoke means to the clapper armature with a high density and free of loss, something which ensures high switching forces.

It is convenient for the clapper armature to be pressed by spring means against the closure section. The spring means also ensure that the clapper armature remains engaged with a pivot point during the switching over movement, such point being located in the transitional zone between the closure section and the valve housing.

In the case of the closure section it is best a question of a section of a bow-like yoke part fitting around the coil.

For the supply of the necessary electrical actuating signals the solenoid valve is conveniently fitted with a printed circuit board, which possesses suitable connection contacts. The electrical connection between the printed circuit board and the coil is produced preferably by the provision on the valve housing of at least two electrical contact lugs, which are spaced apart, and are electrically connected with the coil, between which lugs the printed circuit board is located, the printed circuit board possessing electrical contact areas at its edge for the other contact areas to rest against. It is in this manner that there is a simply releasable plug connection, which renders possible a simple substitution of the printed circuit board, when the solenoid valve is to be modified for a different operating voltage.

The coil and any printed circuit board are preferably accommodated and protected in a hood mounted on the valve housing with the hood's opening directed forward. This hood constitutes a sort of further housing in addition to the valve housing. There is the possibility of providing a plurality of hoods, each with particular printed circuit boards for fitting a solenoid valve, which may be selectively employed more especially in a manner dependent on the operating voltage for the respectively used coil.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 3:
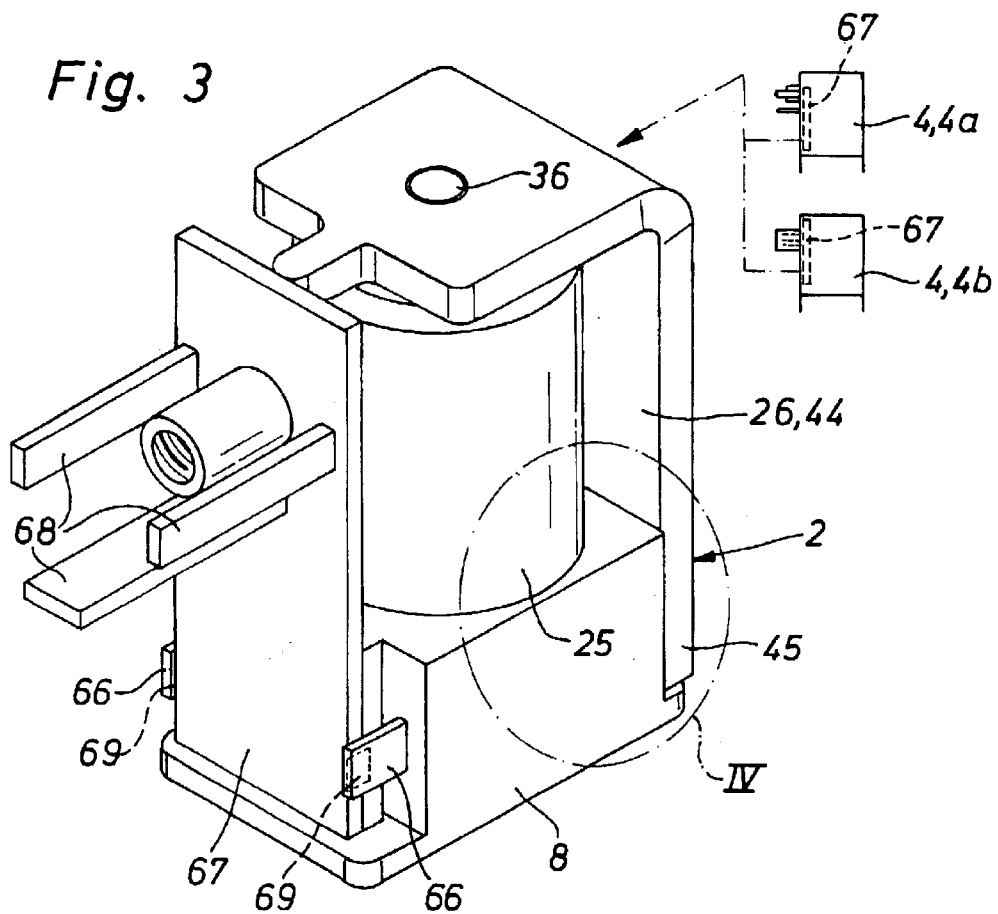
FIG. 3 is a separate elevation of the valve housing having the coil, the yoke means and a printed circuit board, a plurality of alternative designs of hood being indicated diagrammatically and separately, which are able to be employed with this arrangement.
Figure 4:
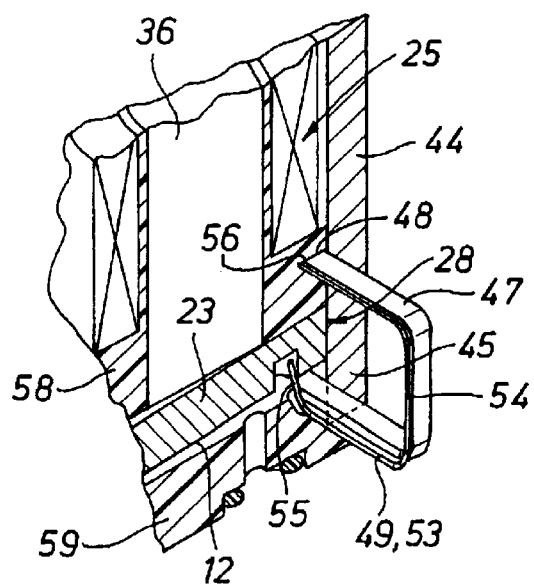
FIG. 4 shows the section IV, marked in FIG. 3, in a sectional elevation.

The solenoid valve generally referenced 1 comprises a valve unit 2, depicted in separately again in FIG. 3, which is mounted on a connection body 3 and is surrounded by a hood 4. The hood 4 is slipped over the valve unit 2 and is attached by attachment lugs 6, provided adjacent to the hood opening 5, by pins or some other suitable means on the connection body 3. The corresponding attachment means are indicated at 7.

The valve unit 2 comprises a preferably plastic valve housing 8. In the valve housing 8 a shallow, elongated valve chamber 12 is formed, preferably by a pocket-like recess in the valve housing 8. At one end of the valve chamber 2 there is an opening sealed in a pressure-tight manner, which in the following will be termed the installation opening 13.

In the case of the solenoid valve 1 of the working example it is a question of a 3/2 way valve. That is to say three valve openings 14 are directed into the valve chamber 12, which constitute a supply opening 14a, a power opening 14b and an outlet opening 14c.

From all three valve openings 14 there extends a respective fluid duct 15a, 15b and, respectively, 15c, which opens at the mounting face 16, facing the connection body 3, of the valve housing 8. By means of intermediately placed seals 17 each fluid duct 15a, 15b and 15c communicates with a further fluid duct 18a, 18b and 18c provided in the connection body 3. The latter ducts open at the outer face of the more particularly block-like body 3, connection means being provided at the openings to render possible the connection of fluid lines.

By means of the further fluid duct 18a communicating with the supply opening 14a during operation of the solenoid valve 1 a fluid pressure medium is supplied, more particularly in the form of compressed air. At the further fluid duct 18b communicating with the power opening 14b a load, as for example a fluid operated drive, may be connected. By way of the fluid duct 18c connected with the outlet opening 14c pressure medium returning from the load may be let off or vented.

The power opening 14b is constantly connected with the valve chamber 12. The supply opening 14a and the outlet opening 14c are opposite each other in the vertical direction of the valve chamber 12, a moving closing valve member 22 being located between them. Dependent on the position of switching of the solenoid valve 1 one of the two above mentioned openings is sealed off by the closing valve member 22 and the respectively other opening is opened. It is in this manner that the power opening 14b may be selectively connected via the valve chamber 12 with the supply opening 14a or with the outlet opening 14c.

As an actuating element for the closing valve member 22 a clapper armature 23 is provided. It is also located in the interior of the valve chamber 12 and is a component of an electromagnet generally referenced 24, which inter alia also comprises a coil 25 and a yoke means 26.

The clapper armature 23 has an elongated configuration and is preferably plate-like. By exciting and respectively by ceasing excitation of the coil 25 it may be caused to perform a pivoting movement about pivot point 28 located at its rear end portion 27. As part of such pivoting motion the closing valve member 22 is moved between its two closed positions. The closing valve member 22 is arranged at the front end portion 29 of the clapper armature 23.

Figure 2:
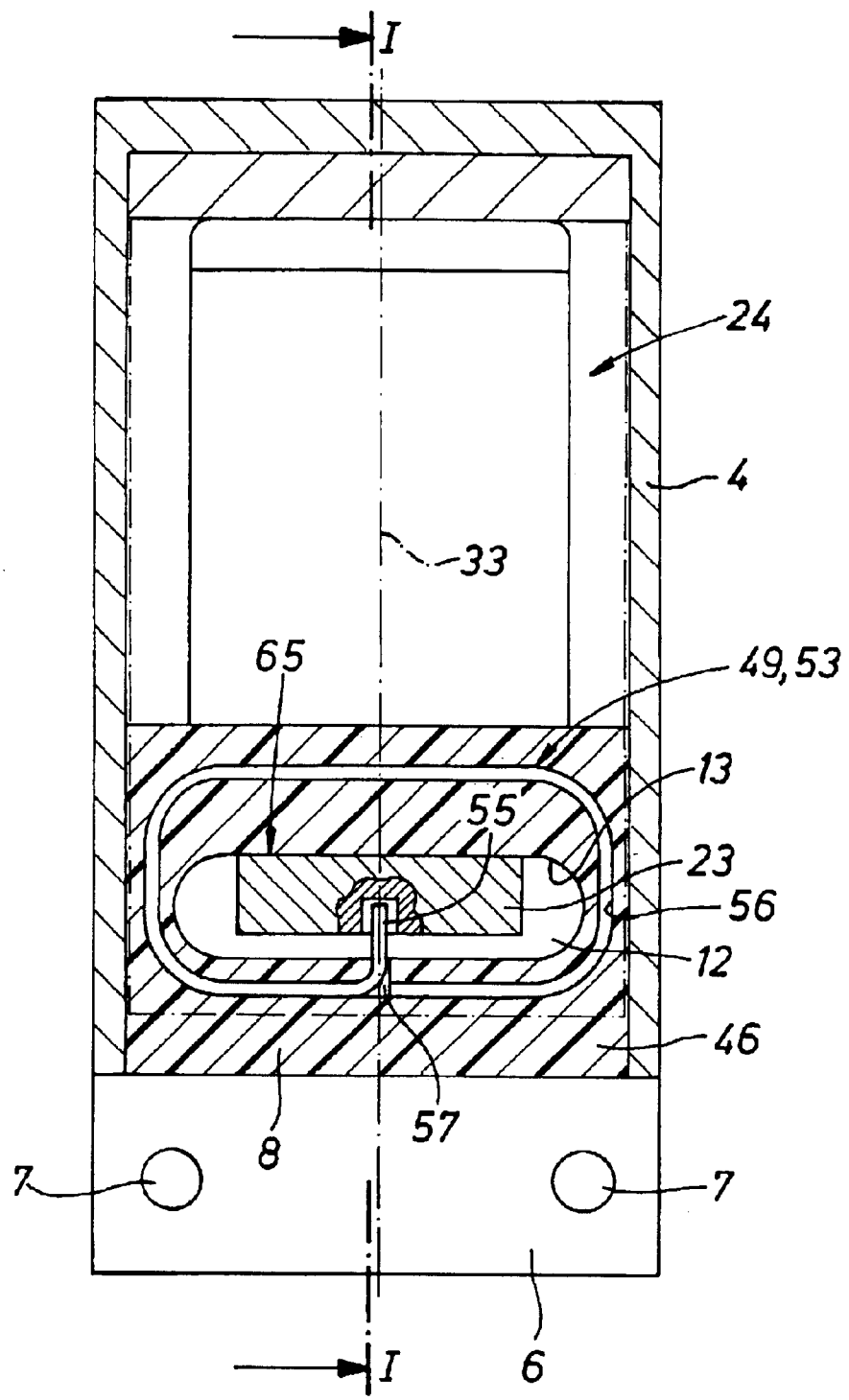
FIG. 2 shows a solenoid valve as in FIG. 1 in a section taken on the line II—II without showing the connection body.

The pivoting or rocking motion of the clapper armature 23 takes place in a pivoting or rocking plane 33 indicated in chained lines in FIG. 2. The coil 25 is so externally placed on the valve housing 8 that its longitudinal axis 34 coincides with the pivoting plane 33 of the clapper armature 23.

Alongside the clapper armature 23 in the pivoting plane 33 a housing opening 35 opens into the valve chamber 12, into which a preferably rod-like stationary armature 36 of the electromagnet 24 is plugged. Its end face facing the clapper armature 23 constitutes an attraction face 37 and in the working example constitutes the top face of the clapper armature 23. Preferably, it runs flush with the wall face, surrounding the housing opening 35, of the valve chamber 12.

The stationary armature 36 extends past the valve housing 8 and through a tubular coil support 38, on which the coil winding 42 of the coil 25 is seated. The coil support 38 is preferably made integrally with the valve housing 8.

The yoke means 26 serving as a magnetic return is—for instance by riveting—joined with the of the outer end portion 43 opposite the attraction face 37 of the stationary armature 36 and extends to fit around the coil 25 as far as the valve housing 8. The coil 25 is in this case flanked by the yoke means 26 on the end face opposite to the valve housing 8 and at one point on its periphery by the yoke means 26. It is convenient for the yoke means to consist of a bow-like yoke part 44 in the form of a letter L.

The yoke part 44 overlaps the valve housing 8 at the installation opening 13, its section at the same level as the installation opening 13 constituting a closure section 45, which directly causes a well sealed closure of the installation opening 13. The closure section 45 is preferably plate-like in design and covers over the installation opening 13 like a lid. In this case it lies on the external face which surrounds the installation opening 13 and here will be termed the rear outer face 46.

The closure section 45 is in the working example constituted by the end section of the longer limb of the L-like yoke part 44. Owing to the firm connection of the other, shorter L-like limb with the external end portion 43 of the stationary armature 36 extending through the coil 25 the closure section 45 is firmly thrust against the rear adjoining face 46.

The clapper armature 23 may, when the yoke means 26 is removed, be inserted through the open installation opening 13 into the valve chamber 12.

For the valve chamber 12 to be closed in a fluid-tight at the installation opening 13 in the working example of the invention an additional seal 47 is placed between the valve housing 8 and the closure section 45. The seal 47 is in the form of a ring or frame, it surrounding the installation opening 13. It is convenient for it to be seated in a groove-like recess 48 made in the rear outer face 46 of the valve housing 8.

The clapper armature 23 has its rear end portion 27 resting pivotally on the closure section 45 covering over the installation opening 13. Preferably, it is thrust by spring means 49 at the rear on the closure section 45 more especially in such a fashion that independently of the switching position of the clapper armature 23 a constant contact with the closure section 45 and accordingly the yoke means 26 is maintained.

In the working embodiment the spring means 49 are constituted by spring bow 53 having an annular holding section 54 and a pin-like working section 55. The annular holding section 54 is arranged around the installation opening 13 where it is secured between the valve housing 8 and the closure section 45. It is convenient for it to be seated on a holding groove 56 extending along the groove-like recess 48, such groove 56 adjoining the floor of the groove-like recess 48. It is in this manner that the holding section 54 assumes a position between the valve housing 8 and the seal 47.

The annular holding section 54 is interrupted at one point. The point of interruption 57 is approximately placed in the middle of the width with respect to the clapper armature 23 having the form of a flat strip. At this position at the one end section of the holding section 54 there is a pin-like adjoining working section 55, which is constituted by a bent over end section of the spring bow 53, such section 55 extending from the bottom side opposite to the coil 25 into the valve chamber 12 and engaging the clapper armature 23 from below.

The working section 55 extends into a recess provided on the bottom side of the clapper armature 23. The term "bottom side" is employed to indicate the side of the clapper armature 23 facing away from the attraction face 37.

In the relaxed state the working section 55 is in the spring plane defined by the holding section 54. In the installed condition the working section 55 is bent out from the spring plane and extends obliquely to it. This causes a return force, with which the working section 55 constantly urges to the rear against the closure section 45.

The above mentioned pivot point 28 for the pivoting or rocking movement of the clapper armature 23 is located in the transition zone between the closure section 45 and the section, adjoining the installation opening 13, of the top wall 58 of the valve chamber 12, such wall 58 having the housing opening 58 for the stationary armature 36. Into the corner portion so formed the clapper armature 23 is thrust by the spring means 49, one force component acting as well toward the top wall 58. Accordingly the clapper armature 23 remains securely held at the pivot point 28 even without the provision of a mechanical axle or bearing pin.

When the coil 25 is not excited the clapper armature 23 will assume a position pivoted away from the attraction face 37. This pivoted back switching position is indicated in the drawings. The clapper armature 23 extends in this case from the pivot point 28 obliquely toward the bottom wall 59 of the valve chamber 12 a wedge-like intermediate space being formed in relation to the top wall 58. In this pivoted back position the clapper armature 23 thrusts the closing valve member 22 against the supply opening 14a, which is accordingly closed. Simultaneously the closing valve member 22 is lifted from the outlet opening 14c which accordingly is joined fluidwise with the power opening 14b.

The pivoted back switching position is brought about by a spring arrangement 63, which within the valve chamber 12 bears against, and is placed between, the valve housing 8 and the clapper armature 23. Preferably, it acts between the front end portion 29 of the clapper armature 23 and the portion surrounding the outlet opening 14c of the top wall 58.

If the coil 25 is electrically excited and accordingly activated a magnetic field will be formed, which pivots the clapper armature 23 against the force of the spring arrangement 63 until the clapper armature 23 abuts the attraction face 37 of the stationary armature 36. In this attracted switching position the closing valve member 22, which is formed separately from the clapper armature 22 in the embodiment, is no longer thrust against the supply opening 14a with the result that the pressure medium acting at the supply opening 14a is in a position to lift the closing valve member 22 and thrust it against the outlet opening 14c. The latter is accordingly sealed off and the pressure medium may flow from the supply opening 14a to the power opening 14b.

Preferably, the clapper armature 23 is made so oblique at the rear that in the pivoted back switching position its rear end face 64 makes contact over its full area with the inner side of the closure section 45. In order to ensure this the rear end face 64 extends, in relation to the top clapper armature face 65 (which faces the attraction face 37) at an angle slightly less than 90 degrees and approximately equal to the wedge angle, which is formed in the pivoted back switching position between the top clapper armature face 65 and the attraction face 37.

The distance "a" between the pivot point 28 and the middle of the attraction face 37 forms, in the working example, the force lever arm on operation of the clapper armature 23. It is smaller than the distance "b", corresponding to the closing lever arm, between the pivot point 28 and the middle of the oppositely placed supply and outlet openings 14a and 14b. Accordingly there is an optimum force transmission ratio. Preferably the lever ratio is 1:2.

In the case of the solenoid valve 1 of the working example a particularly advantageous measure is provided for electrically contacting the coil 25.

In accordance with this measure there are firstly at least two and preferably just two electrical contact lugs 66, which are secured to the valve housing 8, such lugs projecting on the front side, opposite to the installation opening 13, past the valve housing 8. As related to the longitudinal axis 34 the two electrical contact lugs are at the same level, the lugs being opposite each other in the direction athwart the axis. By means of electrical conductors, not illustrated, they are connected with the coil winding 42 electrically.

In the part between the two electrical contact lugs 66 there is an inserted printed circuit board 67 extending in the vertical direction. Its plane of extent is at a right angle to the plane 33 of pivoting of the clapper armature 23. It flanks both the valve housing 8 and also the coil 25 and the end section, extending over the coil 25, of the yoke means 26.

Electrical connection contacts 68 are provided on the printed circuit board 67, by way of which electrical actuating signals may be supplied from the outside, which serve for activating or deactivating the coil 25. By way of printed wiring (not illustrated) on the printed circuit board 67 a connection is produced between the electrical connection contacts 68 and the contact faces 69, which are provided on the edge of the printed circuit board 67 at the electrical contact lugs 66.

The printed circuit board 67 is inserted with a certain degree of bias between the electrical contact lugs 66, which in this case completely or partially extend past the printed circuit board, and rest against faces 69 with a bias. It is in this manner that the electrical connection is produced between the contact faces 69 of the printed circuit board 67 and the electrical contact lugs 66 on the valve housing side. The electrical contact between the printed circuit board 67 and the electrical contact lugs 66 may accordingly be produced extremely simply by a plugging operation. This also makes a replacement of the printed circuit board 67 very simple, if a different configuration or type of electrical connection contacts 68 is desired or if the solenoid valve is to be adapted for a coil 25 requiring a different voltage.

The latter is more particularly relevant if the printed circuit board 67 is employed with the components 70 of electronic control circuitry for the coil 25. In accordance with the respective operating voltage it is then possible for a printed circuit board 67 with specifically selected electronic control circuitry to be employed on a case to case basis.

Figure 1:
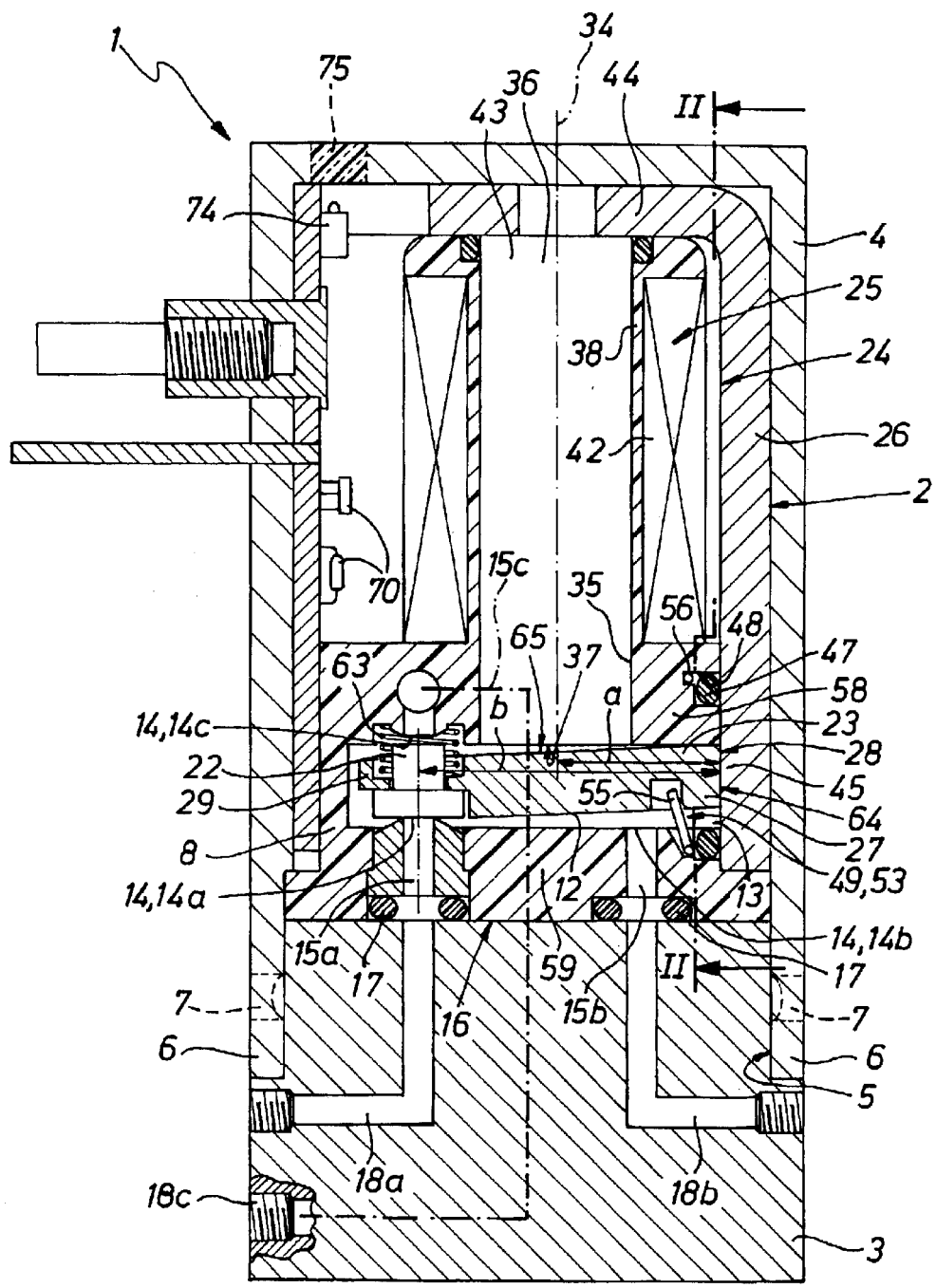
FIG. 1 shows a preferred design of the solenoid valve in accordance with the invention in a longitudinal section taken on the line I—I of FIG. 2.

The printed circuit board 67 may, if necessary, also be fitted with luminous display means 74, which indicate the instantaneous operating state. The hood in place, which surrounds both the coil 25 and also the printed circuit board 67, can then be at least partially be made transparent to light. As shown in FIG. 1 a transparent portion, which is adjacent to luminous display means 74, of the hood 4 is indicated at 75.

Since the electrical connection contacts 68 extend through the wall of the hood 4, a specific design of hood matching the electrical connection contacts 68 is needed. In order to be able to flexibly adapt to the requirements of users, it is accordingly an advantage to have available a plurality of hoods, indicated for instance in FIG. 3 at 4a and 4b, each with their own specifically associated printed circuit board 67, which are able to be installed alternatively in accordance with requirements. Furthermore, in this manner replacement is possible without any problems, if the solenoid valve must be modified owing to a change in conditions of application.

During assembly of the solenoid valve the clapper armature 23 is inserted, prior to the installation of the yoke means 26, through the installation opening 13 (which is then free) into the valve chamber 12. After the clapper armature 23 is fully fitted in place, for closing the valve chamber 12 the clapper armature 26 is put in place. Before the yoke means 26 is attached, the clapper armature 23 extends to the rear some distance past the installation opening 13 to the outside. The spring bow 53 is then located in the relaxed basic condition. On putting on the yoke means 26 the clapper armature 23 is pushed in through the closure section 45 into the valve chamber 12, the working section 55 engaging the clapper armature 23 of the spring bow 53 being bent outward so that a spring force is produced thrusting the clapper armature 23 against section 45.

What is claimed is:

1. A solenoid valve comprising an electromagnet having a coil with an associated yoke means and furthermore a clapper armature for the operation of at least one closing valve member, and a valve housing bearing the coil, said housing having a valve chamber containing the clapper armature with the closing valve member, into which valve chamber an installation opening for the clapper armature is directed, said installation opening being aligned as an extension of the clapper armature and being closed in a sealing manner, wherein the installation opening is directly closed by a section of the yoke means, the clapper armature bearing at the rear in a pivotal fashion on such closure section.

2. The solenoid valve as set forth in claim 1, wherein the closure section is designed like a plate.

3. The solenoid valve as set forth in claim 1, wherein the closure section covers over the installation opening like a lid.

4. The solenoid valve as set forth in claim 1, further comprising a seal arranged between the valve housing and the closure section, such seal surrounding the installation opening and preferably being placed in a groove-like recess in the valve housing.

5. The solenoid valve as set forth in claim 1, wherein the valve chamber is constituted by a pocket-like recess in the valve housing.

6. The solenoid valve as set forth in claim 1, wherein the closing valve member is associated with a front end portion, facing away from the closure section, of the clapper armature.

7. The solenoid valve as set forth in claim 1, wherein the clapper armature is able to be switched over between an attracted switching position in which the clapper armature is attracted by a stationary armature of the electromagnet, and a switching position pivoted away from the stationary armature.

8. The solenoid valve as set forth in claim 7, wherein the stationary armature is inserted in a housing opening alongside the clapper armature into the valve chamber the clapper armature resting against the end face, facing it in the attracted position of switching, of the stationary armature.

9. The solenoid valve as set forth in claim 7, comprising a spring arrangement arranged in the valve chamber and bearing against the valve housing and the clapper armature, and being placed between them, such spring thrusting the clapper armature toward the pivoted back switching position.

10. The solenoid valve as set forth in claim 7, wherein the clapper armature is made oblique at the rear so that in the pivoted back switching position it has a rear end face engaging the closure section over the full area.

11. The solenoid valve as set forth in claim 1, wherein the pivot point for the pivoting motion of the clapper armature is provided in the transitional portion between the closure section and the wall delimiting the installation opening of the valve housing.

12. The solenoid valve as set forth in claim 1, comprising spring means for urging the clapper armature against the closure section.

13. The solenoid valve as set forth in claim 12, wherein the spring means are constituted by a resilient bow, which possesses an annular holding section secured between the valve housing and the closure section of the yoke means and furthermore a working section constituted by an end portion of the spring bow and extending into the valve chamber, the working section applying a resilient force to the clapper armature.

14. The solenoid valve as set forth in claim 1, wherein the closure section is constituted by a bow-like yoke part surrounding the coil, such yoke part more particularly possessing the shape of a letter L.

15. The solenoid valve as set forth in claim 1, wherein the coil is so placed externally on the valve housing that its longitudinal axis coincides with the plane of pivoting of the clapper armature.

16. The solenoid valve as set forth in claim 1, wherein at least two electrical contact lugs arranged with a spacing between them and electrically connected with the coil extend out from the valve housing, a printed circuit board being so inserted between them, which adjacent to the edge is provided with electrical contact faces, that the electrical contact lugs abut the contact faces, electrical connection contacts being furthermore provided on the printed circuit board for the supply of electrical operating signals.

17. The solenoid valve as set forth in claim 16, wherein the printed circuit board is provided with components of electronic control circuitry for the coil.

18. The solenoid valve as set forth in claim 1, comprising a hood surrounding the coil and any printed circuit board present, such hood being adapted to be secured at its opening to a connection body supporting the valve housing.

19. The solenoid valve as set forth in claim 18, comprising a plurality of alternatively installed hoods each with a specifically associated printed circuit board.

20. The solenoid valve as set forth in claim 1, wherein the support of the coil is designed integrally with the valve housing.

* * * * *